(12) United States Patent
Yun et al.

(10) Patent No.: US 7,408,607 B2
(45) Date of Patent: Aug. 5, 2008

(54) LIQUID CRYSTAL DISPLAY DEVICE

(75) Inventors: Sai Chang Yun, Kumi-shi (KR); Kyo Seop Choo, Kumi-shi (KR); Do Sung Kim, Kumi-shi (KR); Hyung Beom Shin, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/301,783

(22) Filed: Nov. 22, 2002

(65) Prior Publication Data

US 2003/0128325 A1 Jul. 10, 2003

(30) Foreign Application Priority Data

Dec. 20, 2001 (KR) .......................... 10-2001-81870

(51) Int. Cl.
*G02F 1/1343* (2006.01)

(52) U.S. Cl. ........................................ 349/139; 349/143

(58) Field of Classification Search .................. 349/143, 349/129, 139
See application file for complete search history.

(56) References Cited

U.S. PATENT DOCUMENTS

| | | | |
|---|---|---|---|
| 4,691,995 A | | 9/1987 | Yamazaki et al. |
| 5,309,264 A | | 5/1994 | Lien et al. |
| 5,608,556 A | | 3/1997 | Koma et al. |
| 5,666,179 A | | 9/1997 | Koma et al. |
| 5,744,821 A | * | 4/1998 | Song .......................... 257/59 |
| 6,208,399 B1 | * | 3/2001 | Ohta et al. ................... 349/139 |
| 6,285,431 B2 | * | 9/2001 | Lyu et al. .................... 349/143 |
| 6,400,440 B1 | * | 6/2002 | Colgan et al. ................ 349/160 |
| 6,532,054 B2 | * | 3/2003 | Ohmuro et al. ............. 349/143 |
| 6,600,539 B2 | * | 7/2003 | Song .......................... 349/130 |
| 6,738,120 B1 | * | 5/2004 | Song et al. .................. 349/139 |

(Continued)

FOREIGN PATENT DOCUMENTS

EP 0884626 A2 12/1998

(Continued)

OTHER PUBLICATIONS

Y. Tanaka, "Late-News Paper: A New Design to Improve Performance and Simplify the Manufacturing Process of High-Quality MVA TFT-LCD Panels", SID Digest, pp. 206-209.

*Primary Examiner*—Dung T. Nguyen
(74) *Attorney, Agent, or Firm*—McKenna Long & Aldridge LLP (57) ABSTRACT

A liquid crystal display device having a wide viewing angle and a high aperture ratio. The present invention includes first and second substrates, gate and data lines on the first substrate to define at least one pixel region, a thin film transistor formed at a crossing between the gate and data lines. A pixel electrode is connected to the thin film transistor in the pixel region, the pixel electrode having a first electric field inducing window. An auxiliary electrode is at a position corresponding to the first electric field inducing window. A black matrix layer is on the second substrate. A color filter layer is on the black matrix layer. A common electrode is on the color filter layer, the common electrode having a second electric field inducing window or dielectric protrusion at a position corresponding to an end portion of the pixel electrode. A liquid crystal layer is between the first and second substrates.

20 Claims, 8 Drawing Sheets

U.S. PATENT DOCUMENTS 6,937,311 B2 * 8/2005 Song et al. .................. 349/129
7,151,583 B2 * 12/2006 Ahn et al. .................. 349/129

FOREIGN PATENT DOCUMENTS

| | | |
|---|---|---|
| JP | 6235925 | 8/1994 |
| JP | 8101395 | 4/1996 |
| JP | 9061829 | 3/1997 |
| JP | 10177178 | 6/1998 |
| JP | 10333157 | 12/1998 |
| JP | 10333159 | 12/1998 |
| JP | 11133438 | 5/1999 |
| JP | 11142864 | 5/1999 |
| JP | 11248930 | 9/1999 |
| JP | 11326922 | 11/1999 |
| JP | 2000-284329 | * 10/2000 |
| KR | 1999-006951 | 1/1999 |
| KR | 2001-39664 | 5/2001 |
| KR | 2001-0061491 | 7/2001 |
| WO | WO/00/08521 | 2/2000 |

* cited by examiner

LIQUID CRYSTAL DISPLAY DEVICE

This application claims the benefit of the Korean Application No. P2001-81870 filed on Dec. 20, 2001, which is hereby incorporated by reference for all purposes as if fully set forth herein.

BACKGROUND OF THE INVENTION

1. Field of the Invention

The present invention relates to a liquid crystal display device having a wide viewing angle and a high aperture ratio.

2. Discussion of the Related Art

Generally, a liquid crystal display device includes lower and upper substrates facing each other so as to leave a predetermined interval from each other and a liquid crystal layer formed between the lower and upper substrates. The liquid crystal layer is driven by an electric field generated between the lower and upper substrates. The liquid crystal display displays an image by controlling light transmittance through the driven liquid crystal layer.

The currently used liquid crystal layer is a twisted nematic (TN) liquid crystal display device which has a problem with varying the transmittance of light at each gray level in accordance with a corresponding viewing angle. Specifically, the light transmittance is distributed symmetrically in right and left directions but asymmetrically in upper and lower directions, whereby gray inversion is generated.

In order to overcome such a problem, a method is proposed to compensate for the variation of light transmittance in accordance with a corresponding viewing angle by dividing a domain by differentiating a liquid crystal driven in a pixel area.

A liquid crystal display device according to a related art proposed for compensating a viewing angle is explained by referring to the drawings as follows.

Figure 1A:
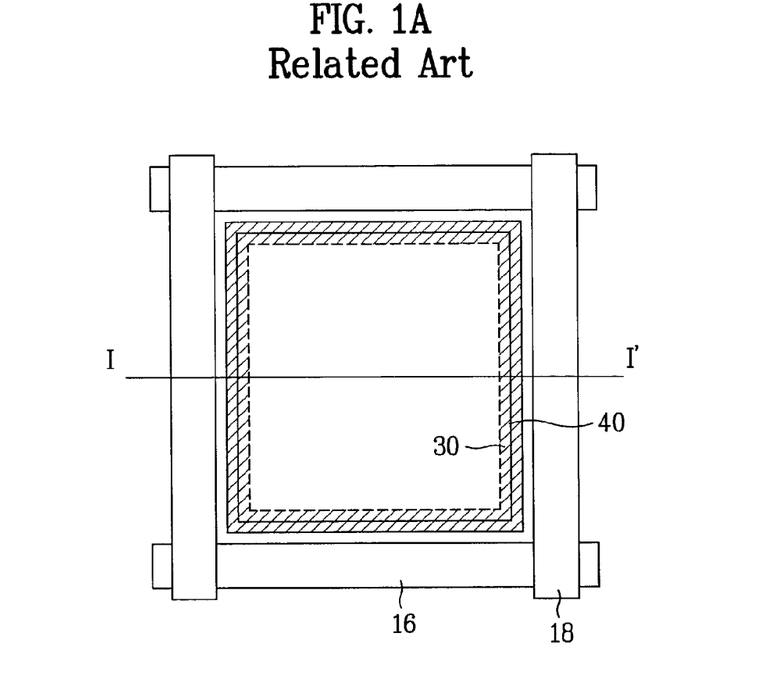
FIG. 1A illustrates a layout of a unit pixel of a liquid crystal display device according to a related art.

FIG. 1A illustrates a layout of a unit pixel of a liquid crystal display device according to a related art.

Figure 1B:
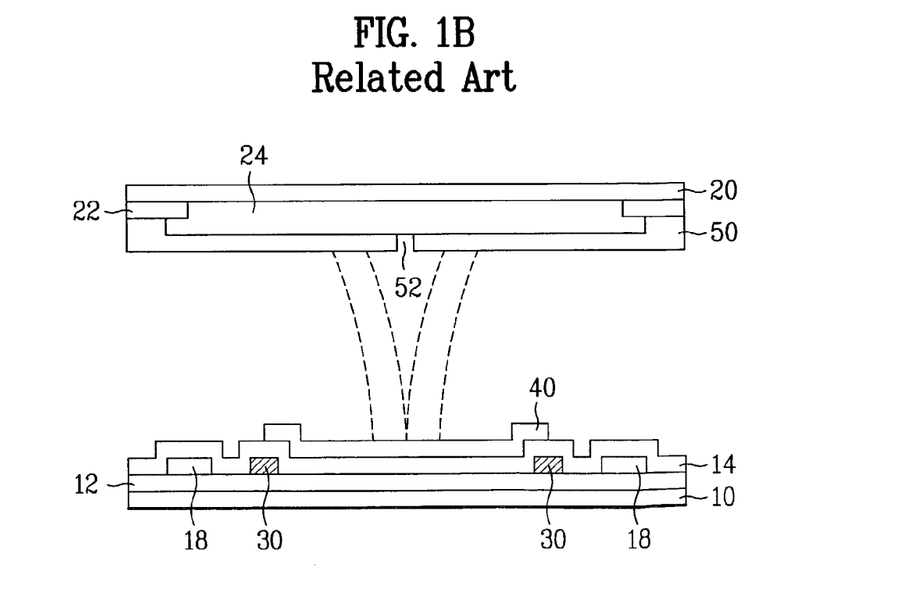
FIG. 1B illustrates a cross-sectional view along a cutting line I-I' in FIG. 1A.

FIG. 1B illustrates a cross-sectional view along a cutting line I-I' in FIG. 1A.

Referring to FIG. 1A and FIG. 1B, a liquid crystal display device according to a related art includes first and second substrates 10 and 20, gate and data lines 16 and 18 formed on the first substrate 10 horizontally and vertically so as to define at least one pixel area. A gate insulating layer 12 is formed on the gate line 16, and a passivation layer 14 is formed on the data line 18. A pixel electrode 40 is formed in the pixel area, and an auxiliary electrode 30 is formed on a same layer of the data line 18 so as to be overlapped with a circumference of the pixel electrode 40. A black matrix layer 22 is on the second substrate 20. A color filter layer 24 and a common electrode 50 are formed on the color filter layer 24 so as to have an electric field inducing window 52 inside. A liquid crystal layer (not shown in the drawing) is between the first and second substrates 10 and 20.

Namely, when an electric field is generated between the pixel and common electrodes 40 and 50 formed on the first and second substrates 10 and 20, respectively, a fringe field, represented by the dotted line in FIG. 1B is formed by the electric field formed inside the common electrode 50. Liquid crystals of the liquid crystal layer at both sides of the common electrode 50 centering around the electric field inducing window 52 are aligned differently in accordance with the fringe field. Thus, the liquid crystal display device according to a related art compensates for the varying transmittance of light corresponding to a viewing angle.

Moreover, the auxiliary electrode 30 formed over the circumference of the pixel electrode 40 reinforces the fringe field so as to effectively drive the liquid crystals located around the pixel electrode 40.

Yet, in the liquid crystal display device according to the related art, the auxiliary electrode 30 formed around the pixel electrode 40 is made of metal failing to transmit light as well as leaving a predetermined interval from the data line 18 so as to prevent short circuit with the data line 18. Hence, a width of the pixel electrode 40 is reduced to decrease an aperture ratio, whereby brightness is reduced.

An additional task of increasing luminance of a backlight is required for the application to a device, thereby causing problems such as large power consumption and the like.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device having a wide viewing angle and a high aperture ratio.

Additional features and advantages of the invention will be set forth in part in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to the present invention includes first and second substrates; gate and data lines on the first substrate to define at least one pixel region; a thin film transistor at a crossing between the gate and data lines; a pixel electrode connected to the thin film transistor in the pixel region, the pixel electrode having a first electric field inducing window; an auxiliary electrode at a position corresponding to the first electric field inducing window; a black matrix layer on the second substrate; a color filter layer on the black matrix layer; a common electrode on the color filter layer, the common electrode having a second electric field inducing window at a position corresponding to an end portion of the pixel electrode; and a liquid crystal layer between the first and second substrates.

In another aspect of the present invention, a liquid crystal display device includes first and second substrates; gate and data lines on the first substrate to define at least one pixel region; a thin film transistor at a crossing between the gate and data lines; a pixel electrode connected to the thin film transistor in the pixel region, the pixel electrode having a first electric field inducing window; an auxiliary electrode at a position corresponding to the first electric field inducing window; a black matrix layer on the second substrate; a color filter layer on the black matrix layer; a common electrode on the color filter layer, the common electrode having a dielectric protrusion at a position corresponding to an end portion of the pixel electrode; and a liquid crystal layer between the first and second substrates.

Namely, the liquid crystal display device according to the present invention drives the liquid crystals in a varying manner in that the electric field applied to the upper and lower substrates is distorted by the electric field inducing window inside the pixel electrode, common electrode, and auxiliary electrode formed on the different layer, thereby realizing a wide viewing angle.

Moreover, the auxiliary electrode is not formed around the pixel electrode but the position corresponding to the electric field inducing window, thereby securing a high aperture ratio.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

First Embodiment

Figure 2A:
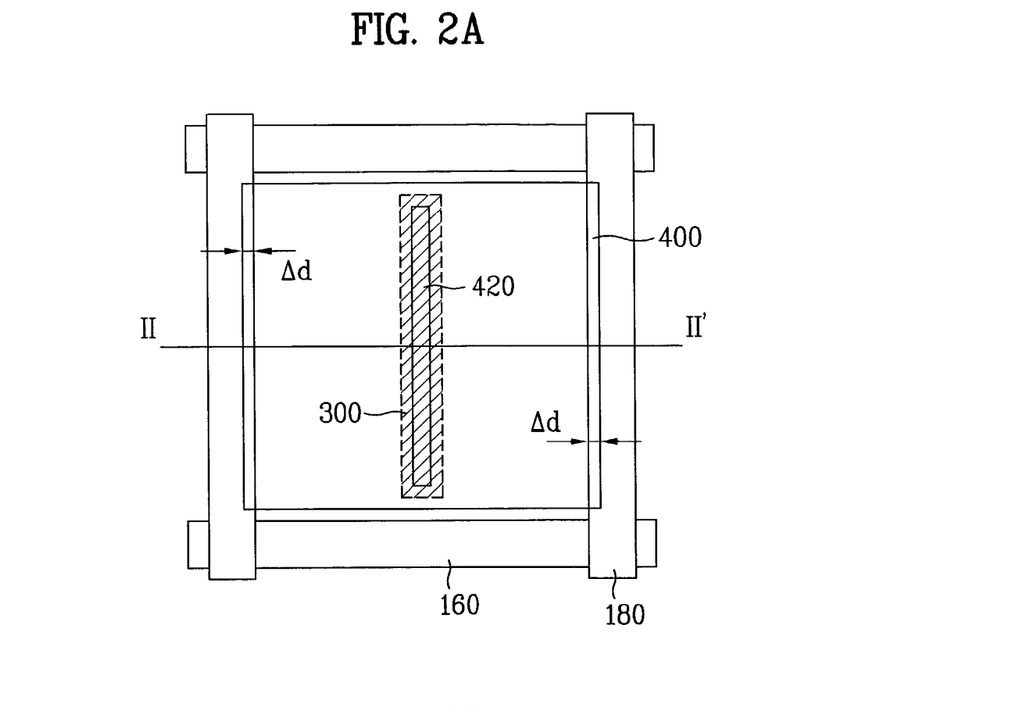
FIGS. 2A to 2C illustrate layouts of a unit pixel of a liquid crystal display device according to an embodiment of the present invention.
Figure 2B:
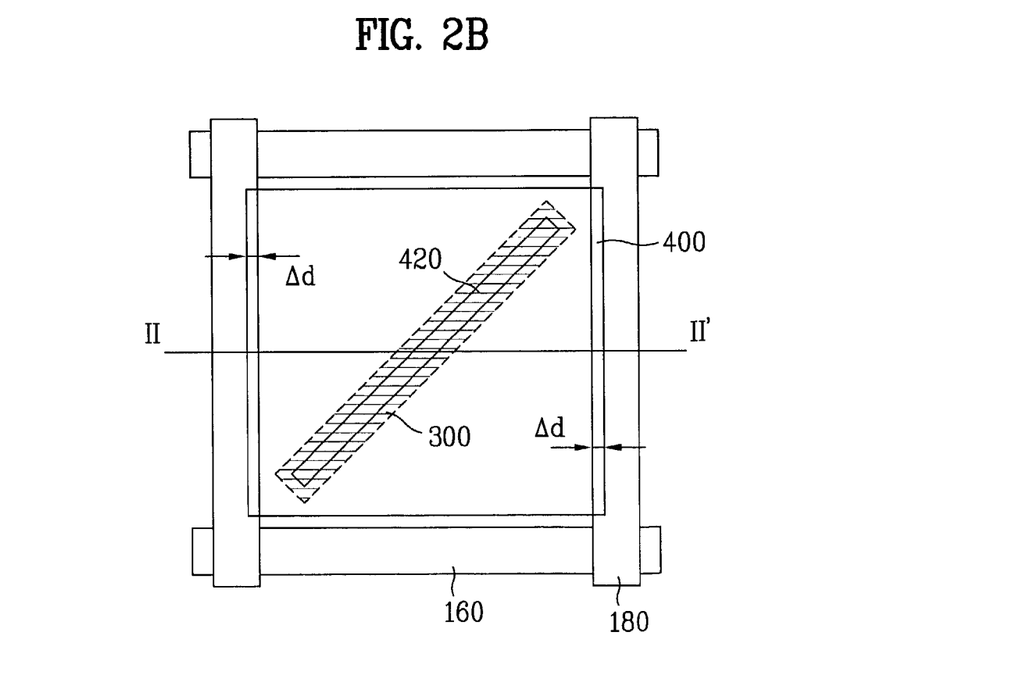
Figure 2C:
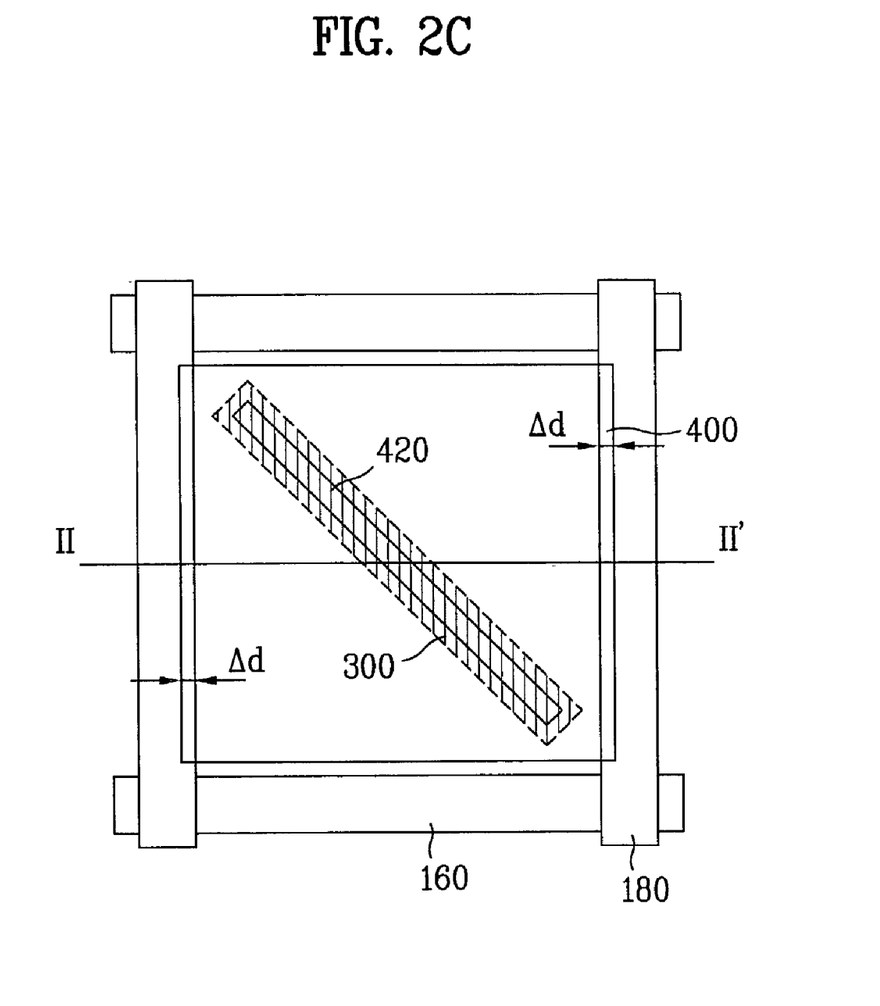

FIGS. 2A to 2C illustrate layouts of a unit pixel of a liquid crystal display device according to an embodiment of the present invention.

Figure 3A:
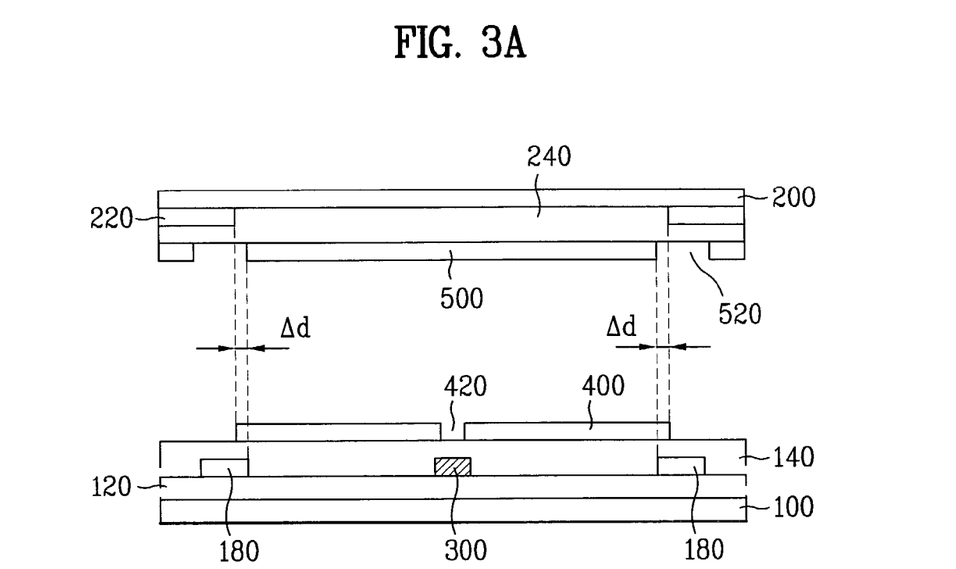
FIG. 3A and FIG. 3B illustrate cross-sectional views along cutting lines II-II' in FIGS. 2A to 2C.
Figure 3B:
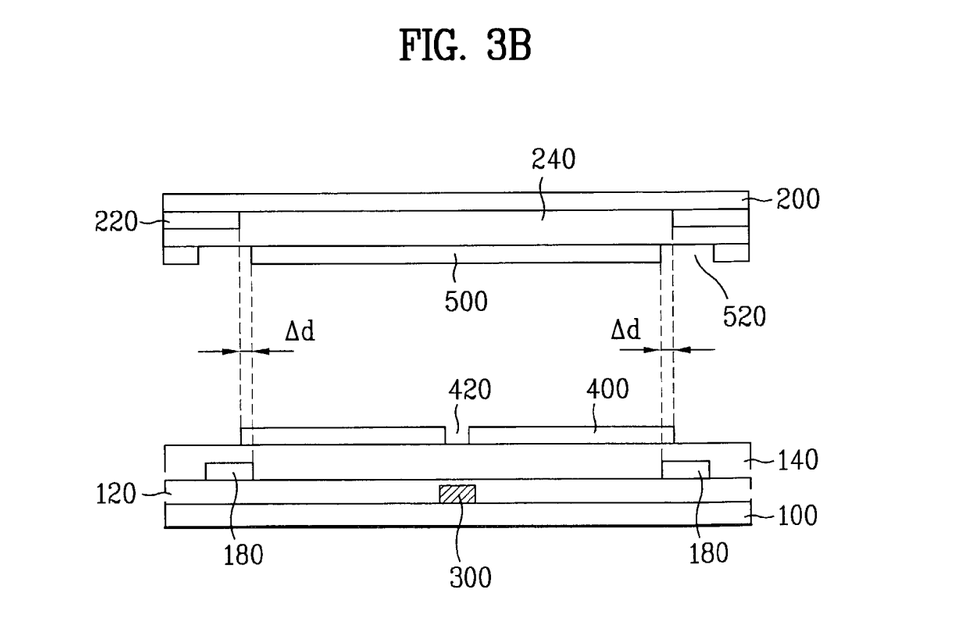

FIG. 3A and FIG. 3B illustrate cross-sectional views along cutting lines II-II' in FIGS. 2A to 2C.

Referring to FIGS. 2A to 2C, FIG. 3A, and FIG. 3B, a liquid crystal display device according to a first embodiment of the present invention includes first and second substrates 100 and 200 facing each other so as to leave a predetermined interval from each other, gate and data lines 160 and 180 formed on the first substrate 100 horizontally and vertically so as to define at least one pixel region, and a thin film transistor (not shown in the drawings) formed at a crossing between the gate and data lines 160 and 180. A pixel electrode 400 is connected to the thin film transistor in the pixel region so as to have a first electric field inducing window 420 inside. An auxiliary electrode 300 is formed at a same layer of the gate or data line 160 or 180 so as to be formed at a position corresponding to the first electric field inducing window 420. A gate insulating layer 120 is formed on an entire surface of the substrate including the gate line 160. A passivation layer 140 is formed on an entire surface of the substrate including the data line 180. A black matrix layer 220 is formed on the second substrate so as to correspond to portions of the first substrate 100 having the gate line 160, data line 180, and thin film transistor formed thereon. A color filter layer 240 is formed on the black matrix layer 220. A common electrode 500 is formed on the color filter later 240 so as to have a second electric field inducing window 520 at a position corresponding to an end portion of the pixel electrode 400. A liquid crystal layer is formed between the first and second substrates 100 and 200.

The pixel electrode 400 has the first electric field inducing window 420 formed inside. The first electric field inducing window 420, as shown in FIG. 2A, can be formed substantially straight in upper and lower directions at a middle portion of the pixel electrode 400. Besides, the first electric field inducing window 420, as shown in FIG. 2B or FIG. 2C, can be formed substantially diagonally centering around the middle portion of the pixel electrode 400. Moreover, The first electric field inducing window 420 can be formed to have one of the shapes such as '+', 'x', 'zigzag', and the like. The first electric field inducing window 420 generates a fringe field to divide a domain, thereby realizing a wide viewing angle.

Moreover, the pixel electrode 400, as shown in FIG. 3A and FIG. 3B, is formed to be overlapped with the data line 180 with a predetermined portion Δd, thereby increasing an aperture ratio. In this case, the passivation layer 140, which is formed to prevent signal interference between the pixel electrode 400 and the data line 180, may be formed of an organic insulating layer, such as benzocyclobutene (BCB) or photoacryl having a low dielectric constant.

Besides, when the pixel electrode 400 is formed to be overlapped with the data line 180, the black matrix layer 220 can be formed over the data line 180 as well as the overlapped portion with the pixel electrode 400 so as to increase the aperture ratio.

The auxiliary electrode 300 reinforces the fringe field. The auxiliary electrode 300 is formed to correspond to the first electric field inducing window 420 as well as to electrically connect to the common electrode 500. The auxiliary electrode 300, as shown in FIG. 3A, can be formed on the same layer of the data line 180. The auxiliary electrode 300, as shown in FIG. 3B, can be formed at the same layer of the gate line 160 or, the auxiliary electrode 300 can be formed on a third layer. In this case, when the auxiliary electrode 300 is formed at the same layer of the gate or data line 160 or 180, the auxiliary electrode 300 and the gate or data line 160 or 180 can be formed simultaneously so as to simplify the process.

The auxiliary electrode 300 is formed with a material unable to transmit light, thereby differentiating alignment directions of liquid crystals from each other centering around the first electric field inducing window 420 as well as reinforcing the fringe field when an electric field is applied thereto. When disclination occurs, the auxiliary electrode 300 prevents transmittance of light as well.

Figure 4A:
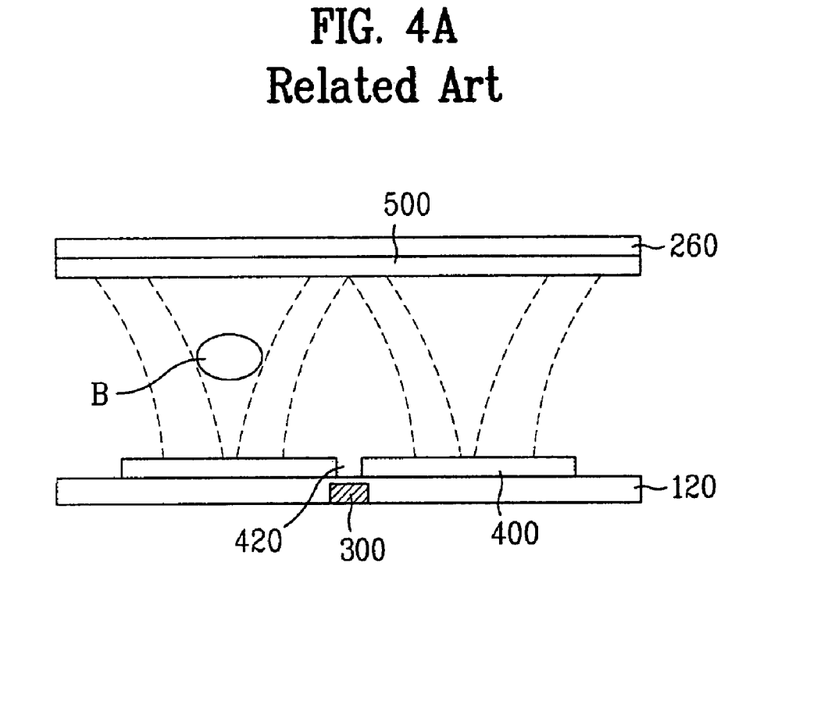
FIG. 4A and FIG. 4B illustrate a cross-sectional graph and a simulation graph of a liquid crystal display device according to a related art.
Figure 4B:
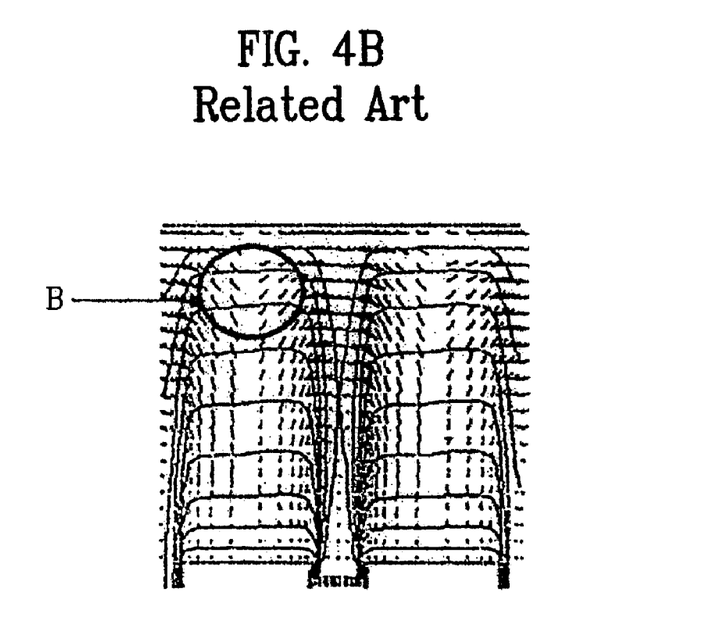

FIGS. 4A and 4B illustrates a cross-sectional graph and a simulation graph of a liquid crystal display device according to the related art.

If the first electric field inducing window 420, as shown in FIG. 4A, is formed inside the pixel electrode 400 and the auxiliary electrode 300 is formed on a portion of a layer which is different from the layer having the pixel electrode 400, corresponding to the first electric field inducing window 420, the fringe field is generated as represented by the dotted line in the drawing. As a result of simulation of the fringe field, as shown in FIG. 4B, the disclination is generated from a portion "B" in FIG. 4B.

In order to overcome the problem shown in FIGS. 4A and 4B, the liquid crystal display device according to the present invention forms the second electric field inducing window 520 in the common electrode 500 formed on an overcoat layer 260 at a position corresponding to an end portion of the pixel electrode on the first substrate.

Figure 5A:
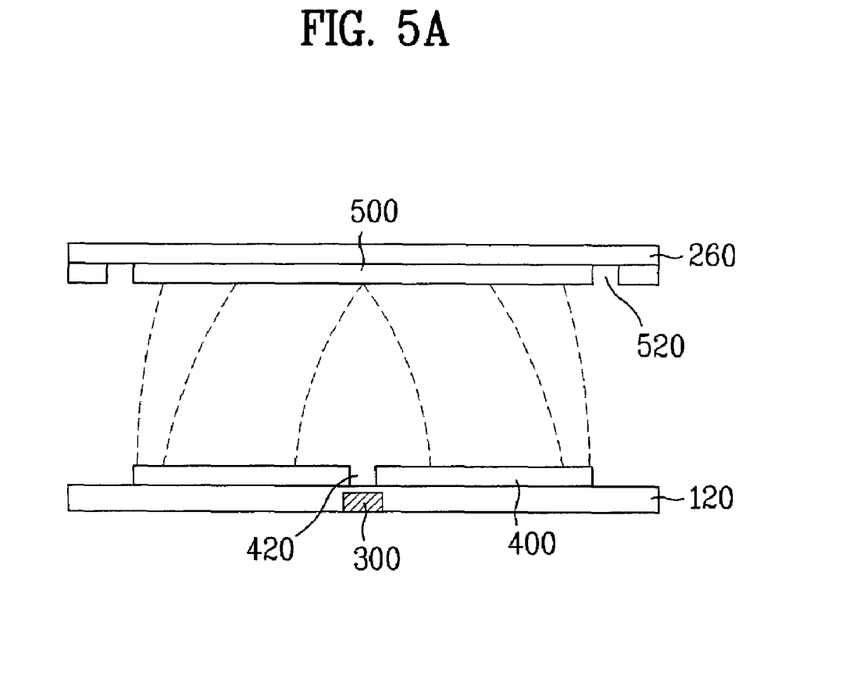
FIG. 5A and FIG. 5B illustrate a cross-sectional graph and a simulation graph of a liquid crystal display device according to the present invention.

FIG. 5A illustrates a schematic cross-sectional view of a liquid crystal display device according to the present invention.

Figure 5B:
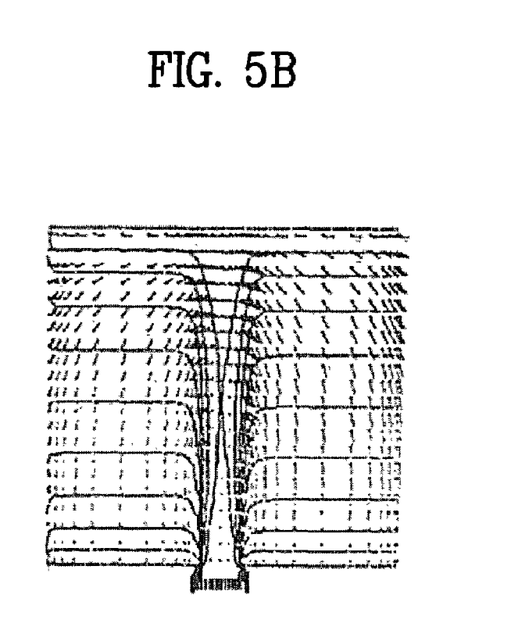

Specifically, the first electric field inducing window 420, as shown in FIG. 5A, is formed inside the pixel electrode 400. The auxiliary electrode 300 is formed on a portion corresponding to the first electric field inducing window 420 in another layer failing to have the pixel electrode 400 formed thereon. The common electrode 500 having the second electric field inducing window 520 is formed at a position corresponding to both end portions of the pixel electrode 400. In this case, a fringe field indicated by the dotted line in the drawing is formed. As a result of simulation, the disclination, as shown in FIG. 5B, fails to occur.

Figure 6A:
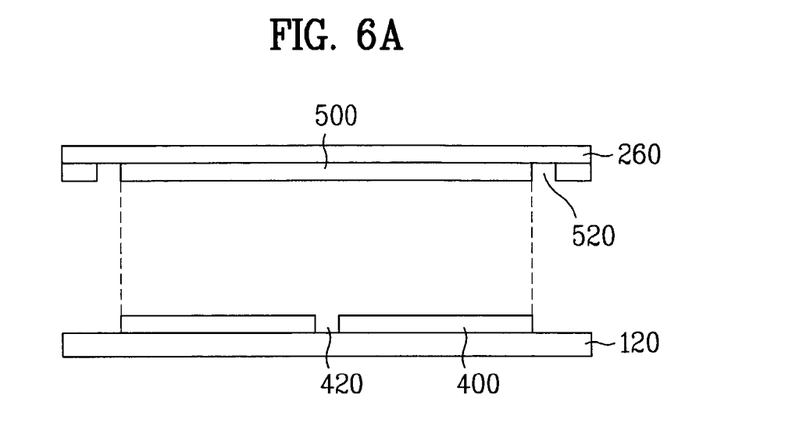
FIGS. 6A to 6C illustrate cross-sectional views of a liquid crystal display device according to the present invention for showing various positions of a second electric field inducing window.
Figure 6B:
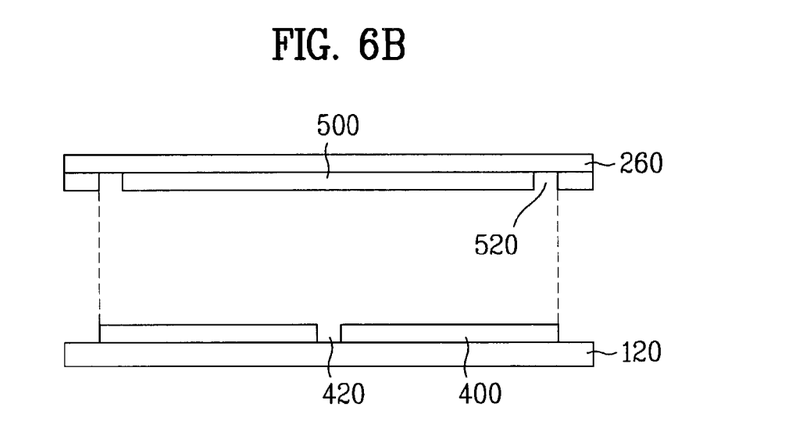
Figure 6C:
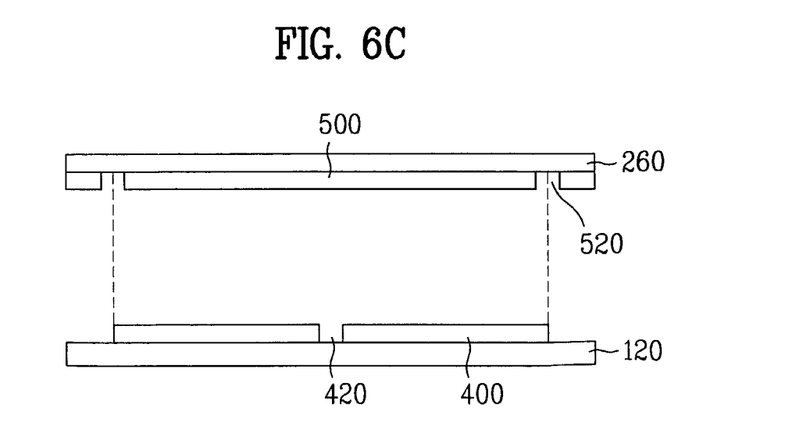

In this case, the second electric field inducing window 520 can be formed at a periphery of the end portion of the pixel electrode 400 (as shown in FIG. 6A), toward the pixel electrode from the end portion of the pixel electrode 400 (as shown in FIG. 6B), or to be overlapped with a portion of the pixel electrode 400 (as shown in FIG. 6C).

The overcoat layer 260 protects the color filter layer 240 as well as helps to form the electric field inducing window. Yet, it is possible to skip the formation of the overcoat layer. Besides, the gate line 160, data line 180, gate insulating layer 120, black matrix layer 220, color filter layer 240, as shown in FIG. 3A and 3B.

The liquid crystal layer is formed with twisted nematic (TN) liquid crystals. Although not shown in the drawing, an alignment layer is formed on an entire surface of at least one of the first and second substrates 100 and 200 so as to determine an initial alignment of the liquid crystal layer.

Chiral dopant can be added to the liquid crystal layer.

The alignment layer can be formed with a material selected from the group consisting of polyamide based compound, polyimide based compound, polyvinylalcohol (PVA), polyamic acid, and the like by rubbing alignment treatment. Instead, the alignment layer can be formed with a photo-reactive material selected from the group consisting of polyvinylcinnamate (PVCN), polysiloxanecinnamate (PSCN), and cellulosecinnamate (CelCN) based compounds by photo-alignment treatment.

In this case, the photo-alignment treatment undergoes at least one light-irradiation so as to determine a pretilt angle, an alignment direction, and a pretilt direction simultaneously. In this case, the light-irradiation is carried out using ultraviolet (UV) rays regardless of non-polarization, unpolarization, linear polarization, and partial polarization.

Second Embodiment

Figure 7A:
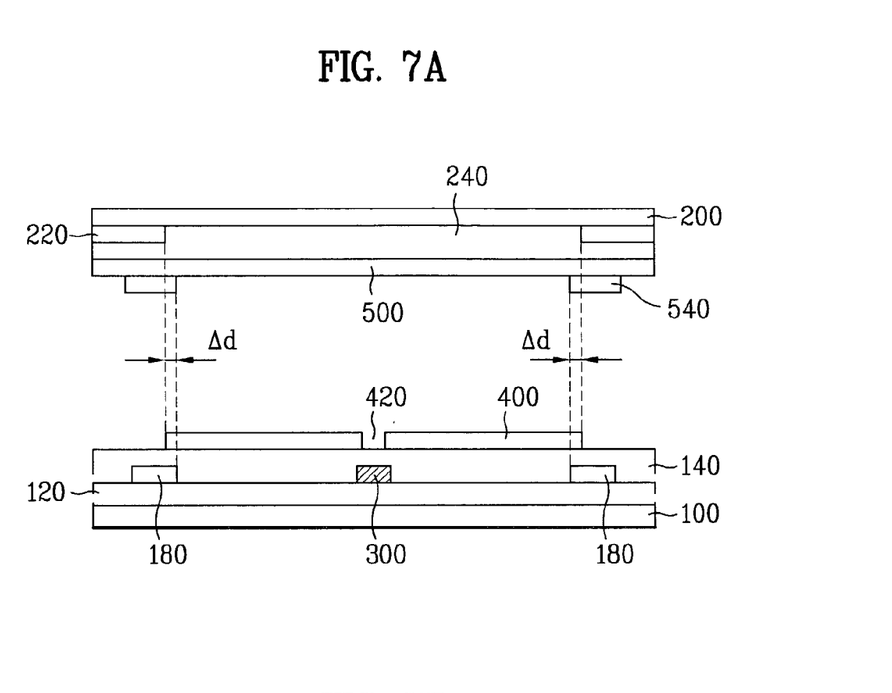
FIG. 7A and FIG. 7B illustrate cross-sectional views according to another embodiment of the present invention along cutting lines II-II' in FIGS. 2A to 2C.
Figure 7B:
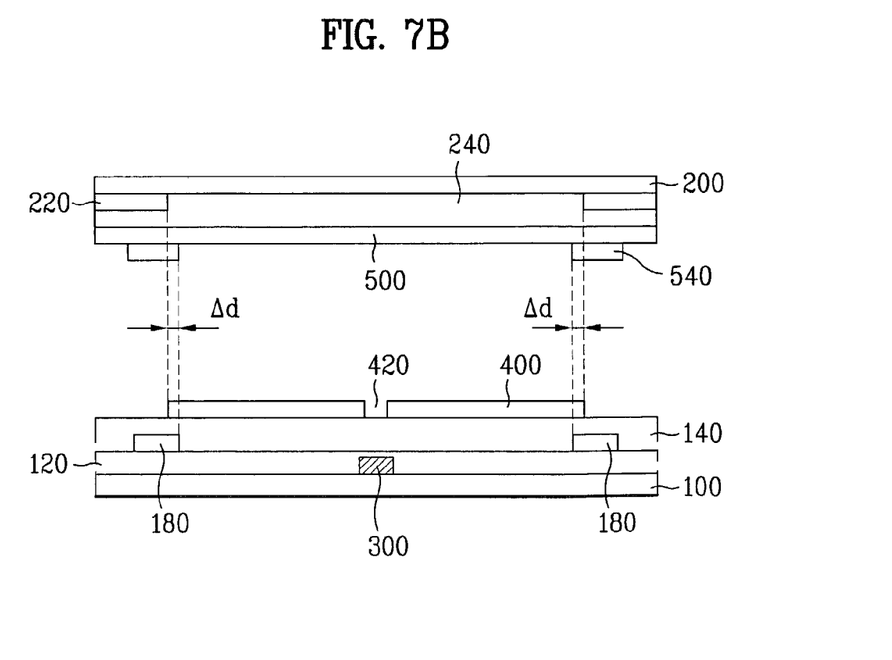

FIG. 7A and FIG. 7B illustrate cross-sectional views according to another embodiment of the present invention along cutting lines II-II' in FIGS. 2A to 2C.

Referring to FIG. 7A and FIG. 7B, a liquid crystal display according to a second embodiment of the present invention does not form the second electric field inducing window 520 inside the common electrode 500 to prevent the generation of disclination in the first embodiment of the present invention but forms a dielectric protrusion 540 on the common electrode 500 so as to realize the same effect.

The dielectric protrusion 540 has a dielectric constant equal to or smaller than that of the liquid crystals. Moreover, the dielectric protrusion is formed on a photosensitive material, such as photoacrylate or benzocyclobutene (BCB).

Moreover, the dielectric protrusion can be formed at one of various positions like the second electric field inducing window of the first embodiment of the present invention. The rest of the elements are equivalent to those of the above-explained first embodiment of the present invention as well as the same numerals are used in the description of the second embodiment of the present invention.

Accordingly, the above-constituted liquid crystal display device according to the present invention has a characteristic of high aperture ratio as well as wide viewing angle, thereby increasing brightness thereof. Therefore, the present invention saves additional cost by realizing high brightness.

Moreover, the present invention forms the auxiliary electrode on the same layer of the data or gate line by the same process, thereby reducing the number of processes.

Besides, the present invention forms the auxiliary electrode considerably apart from the data or gate line, thereby excluding electrical interference completely.

It will be apparent to those skilled in the art than various modifications and variations can be made in the present invention without departing from the spirit or scope of invention. Thus, it is intended that the present invention cover the modifications and variations of this invention provided they come within the scope of the appended claims and their equivalents.

What is claimed is:

1. A liquid crystal display device comprising:
   first and second substrates;
   gate and data lines on the first substrate to define at least one pixel region;
   a thin film transistor at a crossing between the gate and data lines;
   a pixel electrode connected to the thin film transistor in the pixel region, the pixel electrode having a first electric field inducing window;
   an auxiliary electrode at a position corresponding to the first electric field inducing window;
   a black matrix layer on the second substrate;
   a color filter layer on the black matrix layer;
   a common electrode on the color filter layer, the common electrode having a second electric field inducing window at a position corresponding entirely to outer end portions of the pixel electrode with respect to the pixel region to prevent disclination at the outer end portion of the pixel electrode; and
   a liquid crystal layer between the first and second substrates,
   wherein the pixel electrode is overlapped with the data line.

2. The device of claim 1, further comprising a passivation layer under the pixel electrode.

3. The device of claim 2, wherein the passivation layer is formed of an organic insulating layer.

4. The device of claim 1, wherein the black matrix layer is overlapped with another portion of the data line except the overlapped portion between the data line and pixel electrode.

5. The device of claim 1, wherein the auxiliary electrode is formed at a same layer of the gate or data line.

6. The device of claim 1, wherein the second electric field inducing window is overlapped with the pixel electrode.

7. The device of claim 1, wherein the second electric field inducing window is at an area corresponding inward from the end portions of the pixel electrode.

8. The device of claim 1, wherein the second electric field inducing window is at an area corresponding outward from the end portions of the pixel electrode.

9. The device of claim 1, wherein the liquid crystal layer includes twisted nematic liquid crystals.

10. The device of claim 1, further comprising an alignment layer on at least one of the first and second substrates.

11. A liquid crystal display device comprising:
   first and second substrates;
   gate and data lines on the first substrate to define at least one pixel region;
   a thin film transistor at a crossing between the gate and data lines;
   a pixel electrode connected to the thin film transistor in the pixel region, the pixel electrode having a first electric field inducing window;
   an auxiliary electrode at a position corresponding to the first electric field inducing window;
   a black matrix layer on the second substrate;
   a color filter layer on the black matrix layer;
   a common electrode on the color filter layer, the common electrode having a dielectric protrusion at a position corresponding to an outer end portion of the pixel electrode with respect to the pixel region; and
   a liquid crystal layer between the first and second substrates,
   wherein the pixel electrode is overlapped with the data line.

12. The device of claim 11, further comprising a passivation layer under the pixel electrode.

13. The device of claim 12, wherein the passivation layer is formed of an organic insulating layer.

14. The device of claim 11, wherein the black matrix layer is overlapped with another portion of the data line except the overlapped portion between the data line and pixel electrode.

15. The device of claim 11, wherein the auxiliary electrode is formed at a same layer of the gate or data line.

16. The device of claim 11, wherein the dielectric protrusion is overlapped with a predetermined portion of the pixel electrode.

17. The device of claim 11, wherein the dielectric protrusion is formed at an area corresponding inward from the end portion of the pixel electrode.

18. The device of claim 11, wherein the dielectric protrusion is formed at an area corresponding outward from the end portion of the pixel electrode.

19. The device of claim 11, wherein the liquid crystal layer includes twisted nematic liquid crystals.

20. The device of claim 11, further comprising an alignment layer on at least one of the first and second substrates.

* * * * *